(12) United States Patent
Shah et al.

(10) Patent No.: US 8,392,574 B1
(45) Date of Patent: Mar. 5, 2013

(54) PROVIDING SERVICES BASED ON AN ENVIRONMENTAL METRIC

(75) Inventors: Amip J. Shah, Santa Clara, CA (US); Cullen E. Bash, Los Gatos, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 202 days.

(21) Appl. No.: 12/915,866

(22) Filed: Oct. 29, 2010

(51) Int. Cl.
*G06F 15/16* (2006.01)

(52) U.S. Cl. .......... 709/226; 709/225

(58) Field of Classification Search .......... 709/200–202, 709/223, 226, 224–225; 713/300, 320
See application file for complete search history.

(56) References Cited

U.S. PATENT DOCUMENTS

| | | | |
|---|---|---|---|
| 7,698,430 B2 * | 4/2010 | Jackson | 709/226 |
| 2007/0185729 A1 | 8/2007 | Segerman | |
| 2007/0203722 A1 | 8/2007 | Richards et al. | |
| 2009/0171975 A1 | 7/2009 | McConnell et al. | |
| 2009/0177505 A1 | 7/2009 | Dietrich et al. | |
| 2009/0204916 A1 | 8/2009 | Benedek et al. | |
| 2009/0260014 A1 | 10/2009 | Cameron | |
| 2011/0016214 A1 * | 1/2011 | Jackson | 709/226 |
| 2011/0131431 A1 * | 6/2011 | Akers et al. | 713/320 |
| 2011/0251966 A1 * | 10/2011 | Akers et al. | 705/308 |
| 2012/0179824 A1 * | 7/2012 | Jackson | 709/226 |

OTHER PUBLICATIONS

IT Carbon & Energy Allocation Calculator, http://www.apcmedia.com/salestools/WTOL-7WTM24_R0_EN.swf (1 page).
Data Center Carbon Calculator, http://www.apcmedia.com/salestools/WTOL-7DJLN9_R0_EN.swf (1 page).

* cited by examiner

*Primary Examiner* — Moustafa M Meky (57) ABSTRACT

Methods, apparatus, systems and articles of manufacture to provide services based on an environmental metric are disclosed herein. An example method disclosed herein to provide a service based on an environmental metric comprises assigning, with a processor, a workload distribution to distribute a processing workload for the service among first and second processing containers to meet an environmental target, the first and second processing containers to provide the service at respective individual environmental metrics, and combining, with the processor and based on the workload distribution, individual costs incurred by the first and second processing containers to provide the service at the respective individual environmental metrics to determine an overall cost to provide the service using the determined workload distribution.

14 Claims, 7 Drawing Sheets

PROVIDING SERVICES BASED ON AN ENVIRONMENTAL METRIC

BACKGROUND

Cloud computing networks may join (e.g., federate) multiple, distributed processing containers, such as data centers, communication processing infrastructure, etc., to provide on-demand delivery of information technology (IT) services while supporting varying capacity requirements and pay-for-use models. Different processing containers in a cloud can be powered by different energy sources, such as grid power, fuel cells, photovoltaic arrays, etc., having different impacts on the environment.

DETAILED DESCRIPTION

The environmental impact of a processing container (such as a data center, a rack of equipment, server, etc.) can be represented using various environmental metrics. An example of such an environmental metric is carbon content. The carbon content for a given processing container quantifies the greenhouse gas emissions, in terms of actual or equivalent carbon dioxide emissions, resulting from operating the processing container, and is related to the type of energy source used to power the processing container. Also, the cost of providing a service can vary across processing containers having different carbon content. In other words, moving a service to a processing container having a different carbon content can result in a different cost, or a different cost premium, for providing the service.

Cloud service providers are as yet unable to determine service workload distributions such that a service meets a particular (e.g., specified or offered) environmental impact, such as an overall environmental metric (e.g., an overall carbon content metric) for providing the service. Thus, cloud service providers are unable to accurately price a cost of providing a service to account for its carbon content, for example, and are also unable to determine whether moving the service to different processing containers can yield cost benefits under an emissions trading scheme, such as a carbon cap and trade scheme.

Example methods, apparatus, systems and articles of manufacture disclosed herein can fill these needs by determining possible ways to distribute a processing workload for a service among multiple processing containers to meet an environmental target, such as a carbon content target. For example, an overall environmental metric (e.g., an overall carbon content metric) associated with distributing a service's processing workload among multiple processing containers can be determined by combining the individual environmental metrics (e.g., the individual carbon content metrics) at which these processing containers are able to provide the service in proportion to the workload assigned to the processing containers. The amount of processing workload assigned to each of the processing containers is such that the overall environmental metric (e.g., the overall carbon content metric) determined by combining the individual environmental metrics (e.g., the individual carbon content metrics) for the processing containers meets the environmental target (e.g., the carbon content target). In some examples, an overall cost premium for providing a service using a workload distribution among multiple processing containers can be determined by appropriately combining individual cost premiums incurred by the processing containers to provide the service at their respective individual environmental metrics (e.g., individual carbon content metrics). Additionally, in some examples the differences between the overall cost premiums for different workload distributions can be compared to environmental (e.g., carbon) credit costs to determine which of the workload distributions yields a cost benefit under an emissions trading scheme.

For example, consider a service whose processing workload is to be distributed among a first processing container supplied by grid power and having a first carbon content metric and a first individual cost premium for providing the service, and a second processing container supplied by fuel cells and having a second carbon content metric and a second individual cost premium for providing the service. In an example method disclosed herein, a first amount of the workload is assigned to the first processing container and a second amount of the workload is assigned to the second processing container such that a carbon content target is met when the first and second carbon content metrics are combined in proportion to the first and second amounts of the processing workload assigned to the first and second processing containers. Additionally, an overall cost premium for providing the service using this workload distribution is determined by combining the first and second individual cost premiums in proportion to the first and second amounts of the processing workload assigned to the first and second processing containers.

Although example methods, apparatus, systems and articles of manufacture to provide services based on environmental metrics are described herein in the context of providing these services based on carbon content metrics, the example methods, apparatus, systems and articles of manufacture described herein are not limited thereto. Instead, the example methods, apparatus, systems and articles of manufacture described herein can provide services based on many types of environmental metrics, of which carbon content is but an example. For example, the environmental metric(s) used by the example methods, apparatus, systems and articles of manufacture described herein can be replaced or augmented with environmental metrics from which workload distribution(s) and associated cost premium(s) can be determined in accordance with the examples described herein. Examples of other environmental metrics supported by the example methods, apparatus, systems and articles of manufacture described herein include, but are not limited to, natural resource consumption metrics, such as amounts of renewable energy and/or total energy used to provide services, ecological impact metrics, such as toxicity metrics, etc.)

Figure 1:
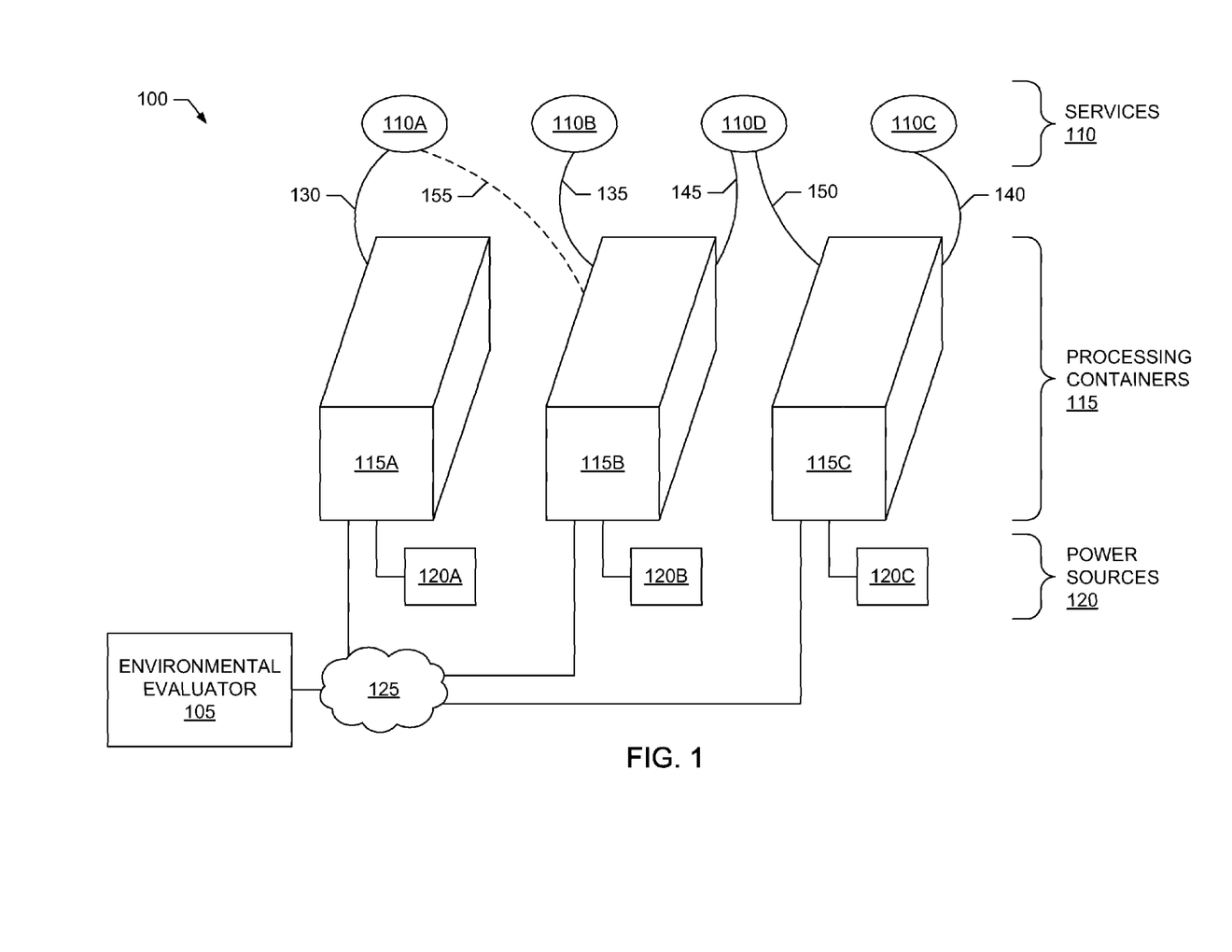
FIG. 1 is block diagram of an example computing network employing an example environmental evaluator to provide services based on an environmental metric as described herein.

Turning to the figures, FIG. 1 is a block diagram of an example computing network 100 employing an example environmental evaluator 105 to provide example services 110 based on environmental metrics. The computing network 100 includes example processing containers 115 to provide the services 110. Each of the processing containers 115 can provide one or more of the service 110, and/or one or more portions of one or more of the services 110. Although three processing containers 115A-C are illustrated in the example of FIG. 1, more or fewer processing containers 115 can be included in the computing network 100. The processing containers 115 of the illustrated example can correspond to data centers, computing sites, racks of computing equipment, computers, servers, etc., and/or any type of processing element, or combination thereof, capable of providing one or more of the services 110, and/or portions thereof. Additionally or alternatively, one or more of the processing containers 115 can correspond to logical representations of the aforementioned example physical devices. For example, one or more of the processing containers 115 could correspond to one or more logical, or virtual, servers deployed across or otherwise combining multiple physical servers. The services of the illustrated example are one or more applications, processes, functions, procedures, etc., and/or combination thereof executed, performed, etc., or otherwise provided by the processing containers 115 to, for example, one or more users, customer, client devices/systems, etc. Although four services 110A-D are illustrated in the example of FIG. 1, more or fewer services 110 can be provided by the computing network 100.

The processing containers 115 obtain power from example power sources 120. The power sources 120 can be implemented by any type or combination of power sources. In the illustrated example, the power source 120A corresponds to a fuel cell power source, the power source 120B corresponds to a photovoltaic array power source, and the power source 120C corresponds to a utility grid power source. Other types and/or combinations of power sources could be used to implement the power sources 120A-C of the illustrated example.

Processing containers powered by different types of power sources can have different impacts on the environment. The different impacts can be measured in terms of one or more environmental metrics. An example environmental metric for measuring the environmental impact of a processing container 115 is carbon content, which measures greenhouse gas emissions associated with operation of the process container 115. For example, the carbon content for the processing container 115A can be measured in terms of an amount of carbon dioxide emitted by the power source 120A (or an equivalent amount of carbon dioxide if the power source 120A emits other type(s) of greenhouse gases) to power the processing container 115A. In the illustrated example, the power source 120C (e.g., the utility grid power source 120C) has the highest carbon content metric for providing a service 110, the power source 120A (e.g., the fuel cell power source 120A) has a relatively lower carbon content metric for providing a service 110, and the power source 120B (e.g., the photovoltaic array power source 120B) has the lowest carbon content metric for providing a service 110 (e.g., which is substantially equal to zero as photovoltaic arrays have negligible greenhouse gas emissions). In some examples, the carbon content of a processing container 115 can be normalized relative to the carbon content associated with a reference power source (such as a utility grid power source) used as a baseline (e.g., worst-case) for comparing the environmental impact of different power sources 120.

In some examples, power sources 120 having lower carbon content have higher operating costs. In other words, a cost premium may be associated with obtaining power from a power source having a lower carbon content than a reference power source (e.g., such as a utility grid power source) having higher carbon content. Other factors can also impact the costs associated with the power sources 120 and/or the prices that can be charged by a service provider based on the power sources 120 powering the processing containers 115 providing the services 110. For example, users may be willing to pay a premium for services 110 having reduced environmental footprints (e.g., resulting from using a processing container 115 powered by a more environmentally-friendly power source 120 to provide a services 110), which can favor power sources 120 having lower carbon content. Additionally or alternatively, users may be willing to pay a premium for having services 110 provided with increased reliability (e.g., resulting from using a processing container 115 powered by a more reliable power source 120 to provide the service 110), which can favor power sources 120 having higher carbon content. As such, the processing containers 115 can have different operating costs and prices, or cost premiums, associated with their respective different power sources 120. For example, the processing container 115C powered by the utility grid power source 120C may have the lowest cost premium for providing a service 110, the processing container 115A powered by the fuel cell power source 120A may have a higher cost premium than processing container 115C for providing a service 110, and the processing container 115B powered by the photovoltaic array power source 120B may have the highest cost premium for providing a service 110.

The environmental evaluator 105 of the illustrated example determines workload distributions for the services 110 based on the environmental (e.g., carbon content) metrics, and their associated cost premiums, associated with the processing containers 115. In the illustrated example, the environmental evaluator 105 is connected to the processing containers 115 via an example communication network 125. The communication network 125 can be implemented by any type of communication network, such as the Internet, one or more cabled or wireless communication networks, one or more public or private data communication networks, etc., or any combination thereof. Using the communication network 125, the environmental evaluator 105 obtains environmental metrics (e.g., carbon content) and associated cost premium statistics (e.g., which can be real-time statistics, statistics averaged over time, etc.) from the processing containers 115. Additionally or alternatively, the environmental evaluator 105 can obtain some or all of the environmental and/or cost premium statistics from one or more person(s), private entity(ies), public entity(ies), government entity(ies), etc., that obtain, collate, store, etc., such data associated with one or more of the processing containers 115.

By way of example, and without loss of generality, operation of the environmental evaluator 105 is described herein-below in the context of carbon content being an example of the environmental metrics capable of being processed by the environmental evaluator 105. However, the environmental evaluator 105 can process other environmental metrics, such as the natural resource consumption and/or ecological metrics mentioned above, in addition or as an alternative to the example carbon content metrics. For example, the carbon content metrics and carbon content targets mentioned when describing operation of the environmental evaluator 105 can be replaced or augmented by one or more other environmental metrics and associated targets.

As described in greater detail below, based on the obtained environmental data (e.g., carbon content) and associated cost premium statistics for the processing containers 115, the environmental evaluator 105 determines one or more workload distributions for the processing workloads of the services 110. For example, to meet a target or offered carbon content, a target or offered cost premium, or both, the environmental evaluator 105 can determine a workload distribution for the service 110A in which its processing workload is assigned to the processing container 115A (represented in FIG. 1 by a line 130). Similarly, the environmental evaluator 105 can determine workload distributions for the services 110B and 110C in which their processing workloads are assigned, respectively, to the processing container 115A and 115B (represented in FIG. 1 by lines 135 and 140). However, for a service 110D, the environmental evaluator 105 may determine that a workload distribution in which the service's processing workload is shared among the processing containers 115B and 115C (represented in FIG. 1 by lines 145 and 150) in a particular proportion is a better choice for meeting a target or offered carbon content, a target or offered cost premium, or both.

In some examples, the environmental evaluator 105 determines a workload distribution for a service 110 that meets an environmental target (e.g., a carbon content target) which may, for example, be specified by a user. For example, a user may specify a target carbon content as an amount of carbon emissions (actual or equivalent) permitted for providing a service, or as a percentage reduction in carbon emissions (actual or equivalent) relative to a reference (e.g., worst case) amount of carbon emissions, etc. Additionally or alternatively, in some examples the environmental evaluator 105 may determine several possible workload distributions for a service 110, each having a different overall environmental metric (which may or may not be a carbon content metric) and associated cost premium, which can be offered to a user. In such examples, the user can then pick and choose among the several workload distributions for one that meets the user's needs.

Additionally, in some examples the environmental evaluator 105 determines overall cost premiums for providing the services 110 using the determined workload distributions. Furthermore, in some examples the environmental evaluator 105 can determine whether a cost benefit results under an environmentally-based (e.g., emissions) trading scheme by moving some or all of a service's processing workload (e.g., such as when the service's processing workload increases or decreases) to one or more different processing containers 115. For example, the environmental evaluator 105 can determine the overall cost premiums for providing the service 110 using the processing container 115A versus the processing container 115B (represented in FIG. 1 by a dashed line 155). The environmental evaluator 105 can then compare the difference between these costs premiums to the difference in environmental credits (e.g., carbon credits) that may need to be purchased under a trading scheme (e.g., a carbon trading scheme) to operate the processing container 115A versus the processing container 115B to determine whether using the processing container 115A or the processing container 115B is more cost efficient.

Additionally or alternatively, in some examples the environmental evaluator 105 can consider other environmentally-based trade-offs in its cost benefit processing. For example, the environmental evaluator 105 can also consider the pricing of energy at different times (e.g., during peak vs. off-peak usage times) and/or based on other energy pricing tiers when determining the cost premiums associated with using different processing containers 115, or sets of processing containers 115, to provide a service 110. Additionally or alternatively, the environmental evaluator 105 can consider costs other than power supply (e.g., energy) costs in its cost benefit processing. For example, the environmental evaluator 105 can also consider costs associated with handling and disposing of certain materials (e.g., hazardous materials) consumed by the processing containers 115, costs associated with varying demand of the natural resources consumed by the processing containers 115, etc., when determining the cost premiums associated with using different processing containers 115, or sets of processing containers 115, to provide a service 110.

Figure 2:
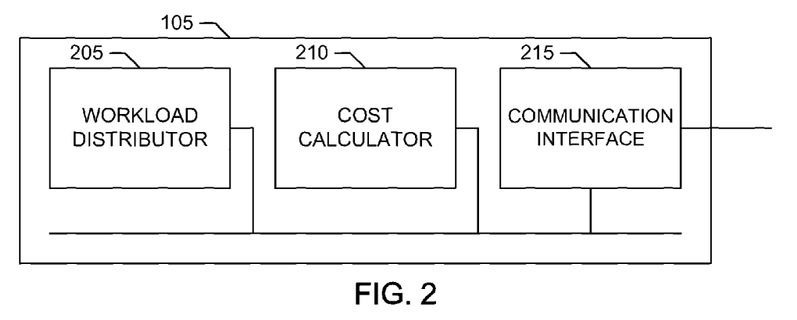
FIG. 2 is a block diagram of an example implementation of the environmental evaluator of FIG. 1.

A block diagram of an example implementation of the environmental evaluator 105 of FIG. 1 is illustrated in FIG. 2. The example environmental evaluator 105 of FIG. 2 includes an example workload distributor 205 to determine one or more workload distributions to distribute a processing workload for a service 110 among sets of one or more of the processing containers 115. The workload distributor 205 also determines overall environmental (e.g., carbon content) metrics for the determined workload distribution(s) by combining individual environmental (e.g., carbon content) metrics associated respectively with the processing containers 115 included in the assigned set(s) of processing container(s) among which the workload is to be distributed. As described above, the individual environmental (e.g., carbon content) metric for a processing container 115 is related to the power source 120 powering the processing container 115. In some examples, the workload distributor 205 determines a workload distribution for a service 110 that distributes the service's processing workload among multiple processing containers 115 having respective individual carbon content metrics for providing the service 110 to meet a carbon content target (e.g., which may be specified by a user of the service or specified by a network provider as an offered carbon content target). In some examples, the workload distributor 205 determines multiple workload distributions for a service 110 in which different workload distributions have different overall environmental (e.g., carbon content) metrics determined by combining the individual environmental (e.g., carbon content) metrics at which the processing containers 115 included in the respective workload distributions can provide the service 110. An example implementation of the workload distributor 205 is illustrated in FIG. 3, which is described in greater detail below.

Figure 4:
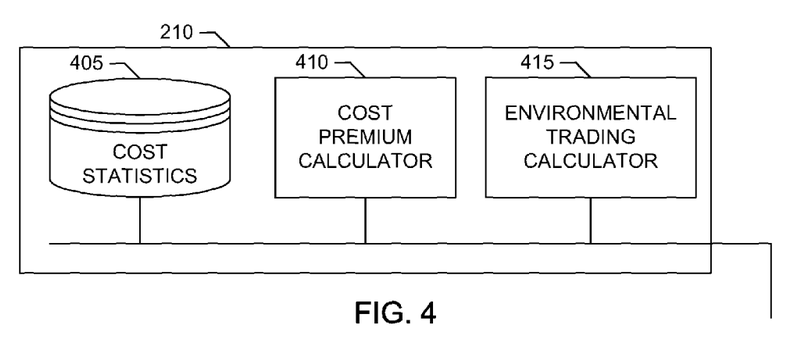
FIG. 4 is a block diagram of an example cost calculator that can be used to implement the environmental evaluator of FIGS. 1 and/or 2.

The environmental evaluator 105 of FIG. 2 also includes an example cost calculator 210 to determine overall cost premium(s) for the workload distribution(s) determined by the workload distributor 205. For example, the cost calculator 210 can determine an overall cost premium for a workload distribution by combining individual cost premiums associated with the processing containers 115 in the set of processing containers among which the service's workload is to be distributed. As described above, different processing containers 115 can incur different individual cost premiums to provide a service 110 at their respective individual environmental (e.g., carbon content) metrics (e.g., because power sources 120 having different carbon content can have different operating costs, such as power sources 120 having lower carbon content can have higher operating costs). In some examples, the cost calculator 210 further determines cost differences between overall cost premiums determined by the cost calculator 210 for different possible workload distributions determined by the workload distributor 205 for a service. In some examples, the workload distributor 205 may use the overall cost premiums determined by the cost calculator 210 for different possible workload distributions having similar or substantially identical overall environmental (e.g., carbon content) metrics to select one of these workload distributions (e.g., the workload distribution having the lowest overall cost premium) for providing the service. Furthermore, in some examples the cost calculator 210 also determines environmental (e.g., carbon) credit costs (e.g., under an emissions trading scheme) for making up the differences in the overall environmental (e.g., carbon content) metrics of the different possible workload distributions. The cost calculator 210 then provides the cost differences and environmental (e.g., carbon) credit costs to the workload distributor 205, which can select a particular workload distribution based on, for example, a cost benefit analysis performed using the cost differences and environmental (e.g., carbon) credit costs. An example implementation of the cost calculator 210 is illustrated in FIG. 4, which is described in greater detail below The environmental evaluator 105 of FIG. 2 also includes an example interface 215 to, for example, connect the environmental evaluator 105 to the network 125 and/or provide other input and/or output interfaces for the environmental evaluator 105. For example, the interface 215 can be used to present different possible workload distributions and associated overall cost premiums for a service 110 to a user. The interface 215 can also be used to receive a user's selection of one of the presented workload distributions for providing the service 110. In some examples, the interface 215 is further used to obtain the individual environmental (e.g., carbon content) and/or cost premium statistics for one or more of the processing container 115. The interface 215 can be implemented by any type of input/output interface, data communication interface, etc., or combination thereof, such as the interface circuit 924 of the example processing system 900 described in greater detail below.

Figure 3:
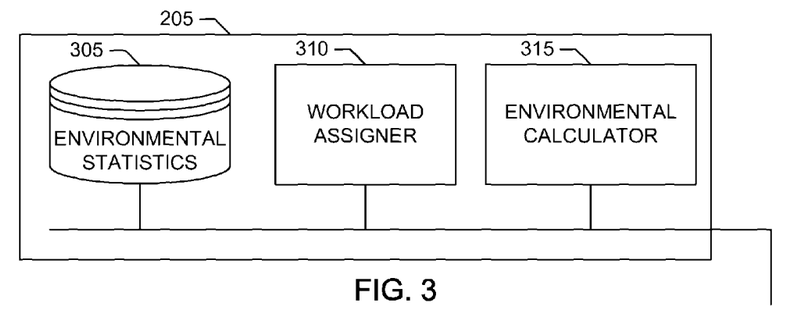
FIG. 3 is a block diagram of an example workload distributor that can be used to implement the environmental evaluator of FIGS. 1 and/or 2.

FIG. 3 is a block diagram of an example implementation of the workload distributor 205 of FIG. 2. The example workload distributor 205 of FIG. 3 includes an example data storage 305 to store the individual environmental (e.g., carbon content) statistics for the processing containers 115. The data storage 305 can be implemented using any type of memory or storage device, or combination thereof, such as the example volatile memory 918 and/or the example mass storage device 930 of the example processing system 900, which is described in greater detail below.

The workload distributor 205 of FIG. 3 also includes an example workload assigner 310 to assign amounts (e.g., portions) of the processing workload of a service 110 to one or more processing containers 115. For example, the workload assigner 310 can select a set of one or more processing containers 115 among which to distribute the processing workload of the service 110. The workload assigner 310 then determines amounts of the processing workload to assign to each of the processing containers 115 in the set. For example, the workload assigner 310 can determine the amounts of the processing workload to assign to each of the processing containers 115 such that a resulting overall carbon content metric associated with the workload distribution meets (e.g., is determined to be less than or equal to) a carbon content target.

To determine the overall environmental (e.g., carbon content) metric associated with a workload distribution determined by the workload assigner 310, the workload distributor 205 further includes an example environmental calculator 315. In some examples, the environmental calculator 315 determines the overall environmental (e.g., carbon content) metric associated with a workload distribution by combining the individual environmental (e.g., carbon content) metrics (e.g., retrieved from the data storage 305) for the processing containers 115 among which the service's workload is to be distributed in proportion to the amount of the processing workload assigned to each of these processing containers 115. For example, with reference to FIG. 1, let $C_{115A}$, $C_{115B}$ and $C_{115C}$ be the individual environmental (e.g., carbon content) metrics for the processing containers 115A, 115B and 115C, respectively, to each provide the service 110D. Assume that the workload assigner 310 determines a workload distribution in which the processing workload for the service 110D is shared among the processing containers 115B and 115C. Let $W_{115B}$ and $W_{115C}$ be the amounts of the processing workload for the service 110D assigned to the processing containers 115B and 115C. Then, the environmental calculator 315 determines the overall environmental (e.g., carbon content) metric, $C_{OVERALL}$, for this workload distribution by combining the individual environmental (e.g., carbon content) metrics $C_{115B}$ and $C_{115C}$ for the processing containers 115B and 115C after weighting in proportion to the amounts $W_{115B}$ and $W_{115C}$ of the processing workload assigned to the processing containers 115B and 115C using Equation 1:

$$C_{OVERALL} = \frac{(W_{115B}C_{115B} + W_{115C}C_{115C})}{(W_{115B} + W_{115C})} \qquad \text{Equation 1}$$

Equation 1 can be rewritten as Equation 2 to further illustrate the weighting of the individual environmental (e.g., carbon content) metrics $C_{115B}$ and $C_{115C}$ in proportion to the amounts $W_{115B}$ and $W_{115C}$ of the processing workload assigned to the processing containers 115B and 115C:

$$C_{OVERALL} = \left(\frac{W_{115B}}{W_{115B} + W_{115C}}\right)C_{115B} + \left(\frac{W_{115C}}{W_{115B} + W_{115C}}\right)C_{115C} \qquad \text{Equation 2}$$

As can be seen from Equation 1 and Equation 2, the workload assigner 310 can adjust the workload distribution among the processing containers 115B and 115C to achieve an overall environmental (e.g., carbon content) metric that can meet an environmental (e.g., carbon content) target or otherwise is desirable to a particular user.

In some examples, a service's processing workload corresponds to, for example, the physical IT resources (e.g., processor cycles, memory utilization, network bandwidth, etc.) for providing the service. For example, a service level agreement (SLA) may specify one or more performance requirements that a service provider is to meet when providing a service 110. Example of such performance requirements include, but are not limited to, a number of service requests and/or users to be supported by the service 110 at a given time, a maximum service latency and/or minimum service response time, etc., which may be defined at, for example, a network-wide application level. These SLA requirement(s) can be mapped to processing workload (e.g., processor cycles, memory utilization, network bandwidth, etc.) requirements that ensure the SLA requirement(s) is met for the service 110. For example, the amounts $W_{115B}$ and $W_{115C}$ in Equation 1 and Equation 2 can represent the portions of the physical IT resources for the service 110D that are to be provided by the processing containers 115B and 115C, respectively. In such examples, Equation 1 and Equation 2 maps the physical IT resources ($W_{115B}$ and $W_{115C}$) assigned, respectively, to the processing containers 115B and 115C to a corresponding environmental impact resulting from providing these IT resources, which is represented by the overall environmental metric, $C_{OVERALL}$, (e.g., which may correspond to carbon content or other physical resource demand(s), such as water consumption, natural resource consumption, etc., or any other metric for measuring environmental impact).

FIG. 4 is a block diagram of an example implementation of the cost calculator 210 of FIG. 2. The example cost calculator 210 of FIG. 3 includes an example data storage 405 to store the individual environmental (e.g., carbon) cost premium statistics for the processing containers 115. The data storage 405 can be implemented using any type of memory or storage device, or combination thereof, such as the example volatile memory 918 and/or the example mass storage device 930 of the example processing system 900, which is described in greater detail below.

The cost calculator 210 of FIG. 4 also includes an example cost premium calculator 410 to determine overall cost premiums associated with workload distributions determined by the workload distributor 205. In some examples, the cost premium calculator 410 determines the overall cost premium associated with a workload distribution by combining the individual cost premiums (e.g., retrieved from the data storage 405) for the processing containers 115 among which the service's workload is to be distributed in proportion to the amount of the processing workload assigned to each of these processing containers 115. For example, with reference to FIG. 1, let $P_{115A}$, $P_{115B}$ and $P_{115C}$ be the individual cost premiums incurred by the processing containers 115A, 115B and 115C, respectively, to provide a service 110 having their respective individual environmental (e.g., carbon content) metrics. In some examples the individual cost premiums $P_{115A}$, $P_{115B}$ and $P_{115C}$ are normalized relative to a reference cost of providing a service, such as the cost of providing a service 110 using the processing container 115C powered by the utility grid power source 120C. In such an example, the individual cost premium $P_{115C}=1$ for providing a service 110, and the individual cost premiums $P_{115A}$, $P_{115B}$ are some multiples (e.g., X and Y) of the cost of purchasing electricity from the utility grid power source 120C. Using the service 110D as an example, let $W_{115B}$ and $W_{115C}$ be the amounts of the processing workload for the service 110D assigned to the processing containers 115B and 115C. Then, the cost premium calculator 410 of the illustrated example determines the overall cost premium, $P_{OVERALL}$, for this workload distribution by combining the individual cost premium $P_{115B}$ and $P_{115C}$ for the processing containers 115B and 115C to provide the service 110D after weighting the costs in proportion to the amounts $W_{115B}$ and $W_{115C}$ of the processing workload assigned to the processing containers 115B and 115C using Equation 3:

$$P_{OVERALL} = \left(\frac{W_{115B}}{W_{115B}+W_{115C}}\right)P_{115B} + \left(\frac{W_{115C}}{W_{115B}+W_{115C}}\right)P_{115C} \quad \text{Equation 3}$$

The overall cost premium, $P_{OVERALL}$, for this workload distribution may be higher than the reference cost of providing the service 110D using electricity purchased from the utility grid power source 120C due to an increased cost premium for obtaining power from the photovoltaic array power source 120B. By charging customers who request that the service 110D be provided using this lower environmental impact (e.g., carbon content) workload distribution the higher overall cost premium, $P_{OVERALL}$, it is possible for the service provider of the network 100 to recover the cost premium of delivering services using the greener, more environmentally friendly processing container 115B. Such a pricing scheme also can allow service providers to gradually reduce their own environmental impact (e.g., carbon emissions) without negatively affecting their profit margins.

In some examples, the cost premium calculator 410 can adjust the overall cost premium determined for a workload distribution based on a cost offset offered to a customer for agreeing to a change in a requirement of, for example, a service level agreement (SLA). For example, a customer wanting a service to be provided with a lower carbon content may be willing to relax a time constraint, a reliability target, etc., specified by an SLA for providing the service in exchange for a reduction in the cost premium. Such cost offsets can be particularly beneficial for a service that involves batch job processing and whose execution priority can be lowered. Such a service could then be performed at favorable pricing by the processing container(s) 115 during times when the cost of power supplying the processing container(s) 115 is lower (e.g., such as during off-hours for utility grid power supplies, during daylight hours for photovoltaic array power sources etc.), and/or when the processing container(s) 115 have additional available processing capacity.

The cost calculator 210 of FIG. 4 further includes an example environmental trading calculator 415 to determine environmental (e.g., carbon) credit costs for different workload distributions and cost differences between the different workload distributions, which can be used by the workload distributor 205 to make workload distribution decisions under an emissions trading scheme. For example, consider a scenario in which the workload distributor 205 determines two different workload distributions for a service 110, and the cost premium calculator 410 determines the overall cost premiums for these different workload distributions. Furthermore, in this example the first of these workload distributions has a higher overall environmental (e.g., carbon content) metric than the second of these workload distributions and, thus, the overall cost premium associated with the second workload distribution is higher than the cost premium associated with the first workload distribution. In such an example, the environmental trading calculator 415 determines a cost difference between the second overall cost premium associated with the second workload distribution and the first overall cost premium associated with the first workload distribution. This cost difference represents an additional cost premium associated with the reduction in overall environmental impact (e.g., carbon content) afforded by using the second workload distribution instead of the first workload distribution. Additionally, the environmental trading calculator 415 determines a environmental (e.g., carbon) credit cost, under an emissions trading scheme, for the difference between the higher overall environmental (e.g., carbon content) metric associated with the first workload distribution and the lower overall environmental (e.g., carbon content) metric associated with the second workload distribution. As such, the environmental (e.g., carbon) credit cost represents the cost of the additional environmental (e.g., carbon) credits that would be needed under the emissions trading scheme to use the first workload distribution (e.g., having the higher overall carbon content metric) instead of the second workload distribution.

In some examples, the cost differences and environmental (e.g., carbon) credit costs determined by the environmental trading calculator 415 are provided to the workload distributor 205 to enable emissions trading costs to be factored into workload distribution decisions. In the preceding example, the cost difference represented an additional cost premium associated with the reduction in overall environmental impact (e.g., carbon content) realized by using the second workload distribution instead of the first workload distribution. Conversely, the environmental (e.g., carbon) credit cost represents the cost of the additional environmental (e.g., carbon) credits that would be needed to use the first workload distribution instead of the second workload distribution. In such an example, the workload distributor 205 can use the cost difference and environmental (e.g., carbon) credit cost determined by the environmental trading calculator 415 to select the first workload distribution to provide the service 110 when the environmental (e.g., carbon) credit cost is less than the cost difference (e.g., when the cost of the additional environmental credits is less than the cost of providing the greener service). Conversely, the workload distributor 205 can use the cost difference and environmental (e.g., carbon) credit cost determined by the environmental trading calculator 415 to select the second workload distribution to provide the service 110 when the cost difference is less than the environmental (e.g., carbon) trading cost (e.g., when the cost of providing the greener service is less than the cost of the additional environmental credits).

By comparing cost differences and environmental (e.g., carbon) trading costs as determined by the environmental trading calculator 415, it is possible to factor in environmental trading costs into the cost premiums charged to customers. For example, if a service 110, such as the service 110A, uses additional resources (e.g., such as a retail website that uses additional processing and networking resources during certain holidays), and these additional resources are to come from a cleaner but more expensive resource (such as the processing container 115B), then the customer can be directed to bear the additional costs associated with providing a portion of the service 110A from this cleaner but more expensive processing resource. Conversely, if these additional resources are to come from, for example, a higher carbon resource (such as the processing container 115C), then the customer can be directed to bear the additional costs associated with purchasing carbon credits for providing a portion of the service 110A from the higher carbon resource (e.g., if the service provider has exceeded its cap under an emissions trading scheme).

Furthermore, depending on the costs of environmental (e.g., carbon) credits under the emissions trading scheme, the service provider can use the cost differences and environmental (e.g., carbon) trading costs from the environmental trading calculator 415 to determine whether to reallocate service workloads among the processing containers 115 to, for example, free up environmental (e.g., carbon) credits for resale on the open market. For example, suppose the cost difference between the cost premium for processing container 115B and the cost premium for processing container 115C is $P_{115B}-P_{115C}$ for a service 110. Let the differential between the environmental (e.g., carbon content) metrics for processing containers 115B and 115C be $C_{115C}-C_{115B}$ for this service. Additionally, let the potential value of the resource in question (e.g., carbon) in the open market be Z (in other words, if the service provider can operate below its environmental (e.g., carbon) cap, each unit of the resource in question (e.g., carbon) could bring in revenue of Z dollars). Then, if $Z \times (C_{115C}-C_{115B}) > (P_{115B}-P_{115C})$, the service provider can decide to migrate the service to processing container 115B and sell the saved environmental (e.g., carbon) credits on the open market, while improving upon the environmental (e.g., carbon content) target promised to users of processing container 115C.

While example manners of implementing the environmental evaluator 105, the workload distributor 205 and the cost calculator 210 have been illustrated in FIGS. 2-4, one or more of the elements, processes and/or devices illustrated in FIGS. 2-4 may be combined, divided, re-arranged, omitted, eliminated and/or implemented in any other way. Further, the example communication interface 215, the example data storage 305, the example workload assigner 310, the example environmental calculator 315, the example data storage 405, the example cost premium calculator 410, the example environmental trading calculator 415 and/or, more generally, the example workload distributor 205, the example cost calculator 210 and/or the example environmental evaluator 105 of FIGS. 2-4 may be implemented by hardware, machine readable instructions (including software and/or firmware) and/or any combination of hardware and/or machine readable instructions. Thus, for example, any of the example communication interface 215, the example data storage 305, the example workload assigner 310, the example environmental calculator 315, the example data storage 405, the example cost premium calculator 410, the example environmental trading calculator 415 and/or, more generally, the example workload distributor 205, the example cost calculator 210 and/or the example environmental evaluator 105 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover an implementation using purely machine readable instructions, at least one of the example environmental evaluator 105, the example workload distributor 205, the example cost calculator 210, the example communication interface 215, the example data storage 305, the example workload assigner 310, the example environmental calculator 315, the example data storage 405, the example cost premium calculator 410 and/or the example environmental trading calculator 415 are hereby expressly defined to include a tangible computer readable medium such as a memory, digital versatile disk (DVD), compact disk (CD), etc., storing such machine readable instructions. Further still, the example environmental evaluator 105, the example workload distributor 205 and/or the example cost calculator 210 of FIGS. 2-4 may include one or more elements, processes and/or devices in addition to, or instead of, those illustrated in FIGS. 2-4, and/or may include more than one of any or all of the illustrated elements, processes and devices.

Flowcharts representative of example machine readable instructions that may be executed to implement the example environmental evaluator 105, the example workload distributor 205, the example cost calculator 210, the example communication interface 215, the example data storage 305, the example workload assigner 310, the example environmental calculator 315, the example data storage 405, the example cost premium calculator 410 and/or the example environmental trading calculator 415 are shown in FIGS. 5-8. In these examples, the machine readable instructions represented by the flowcharts may comprise one or more programs for execution by a processor, such as the processor 912 shown in the example processing system 900 discussed below in connection with FIG. 9. Alternatively, the entire program or programs and/or portions thereof implementing the processes represented by the flowcharts of FIGS. 5-8 could be executed by a device other than the processor 912 (e.g., such as a controller and/or any other suitable device) and/or embodied in machine readable instructions or dedicated hardware (e.g., implemented by an ASIC, a PLD, an FPLD, discrete logic, etc.). Also, one or more of the machine readable instructions represented by the flowcharts of FIGS. 5-8 may be implemented manually. Further, although the example machine readable instructions are described with reference to the flowcharts illustrated in FIGS. 5-8, many other techniques for implementing the example methods and apparatus described herein may alternatively be used. For example, with reference to the flowcharts illustrated in FIGS. 5-8, the order of execution of the blocks may be changed, and/or some of the blocks described may be changed, eliminated, combined and/or subdivided into multiple blocks.

As mentioned above, the example processes of FIGS. 5-8 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 5-8 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise.

Figure 5:
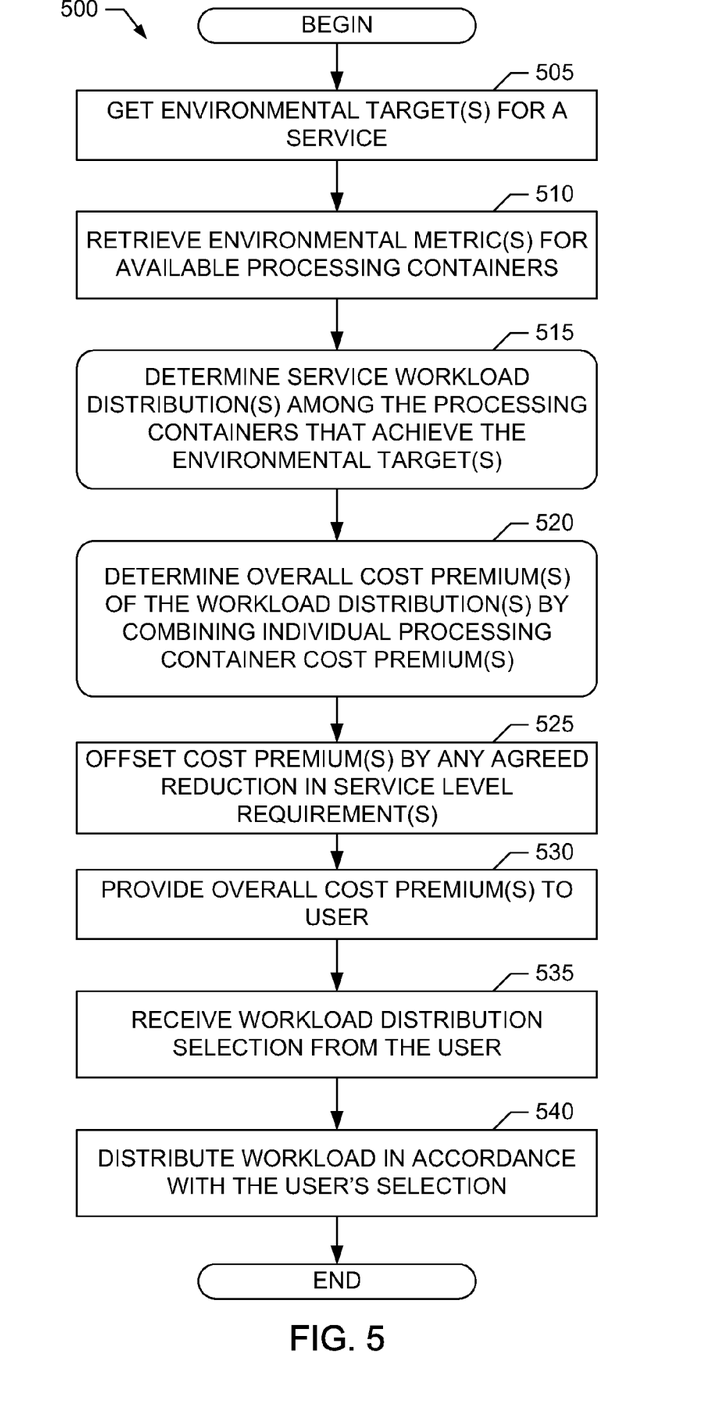
FIG. 5 is a flowchart representative of example machine readable instructions that may be executed to implement the environmental evaluator of FIGS. 1 and/or 2.

Example machine readable instructions 500 that may be executed to implement the example environmental evaluator 105 of FIGS. 1-2 are represented by the flowchart shown in FIG. 5. The example machine readable instructions 500 may be executed at predetermined intervals (e.g., based on a clock/timing source), based on an occurrence of predetermined event(s) (e.g., when a user submits or requests a service 110 to be provided by the network 100), etc., or any combination thereof. With reference to the preceding figures, the machine readable instructions 500 begin execution at block 505 of FIG. 5 at which the workload distributor 205 included in the environmental evaluator 105 gets one or more environmental (e.g., carbon content) targets for a service 110 to be provided by the network 100. For example, the workload distributor 205 may receive a carbon content target via the communication interface 215 from a user of the service, or the service provider of the network 100 may specify one or more carbon content targets at which the service 110 can be offered. The carbon content target(s) obtained at block 505 can be specified in terms of a carbon content amount (e.g., an actual or equivalent amount of carbon dioxide emissions), a percentage relative to a reference (e.g., worst-case) content (such as the carbon content associated with a processing container powered by a utility grid power source), etc.

At block 510, the workload distributor 205 retrieves the individual environmental (e.g., carbon content) metrics for the processing containers 115 to provide the service 110. For example, the individual environmental (e.g., carbon content) metrics for the processing containers 115 can be retrieved from the data storage 305, as described above. At block 515, the workload distributor 205 determines one or more workload distributions for distributing the processing workload for the service 110 among the processing container(s) 115 such that the workload distribution(s) achieve the environmental (e.g., carbon content) target(s) obtained at block 505. Example machine readable instructions that may be used to implement the processing at block 515 are illustrated in FIG. 6, which is described in greater detail below.

Figure 7:
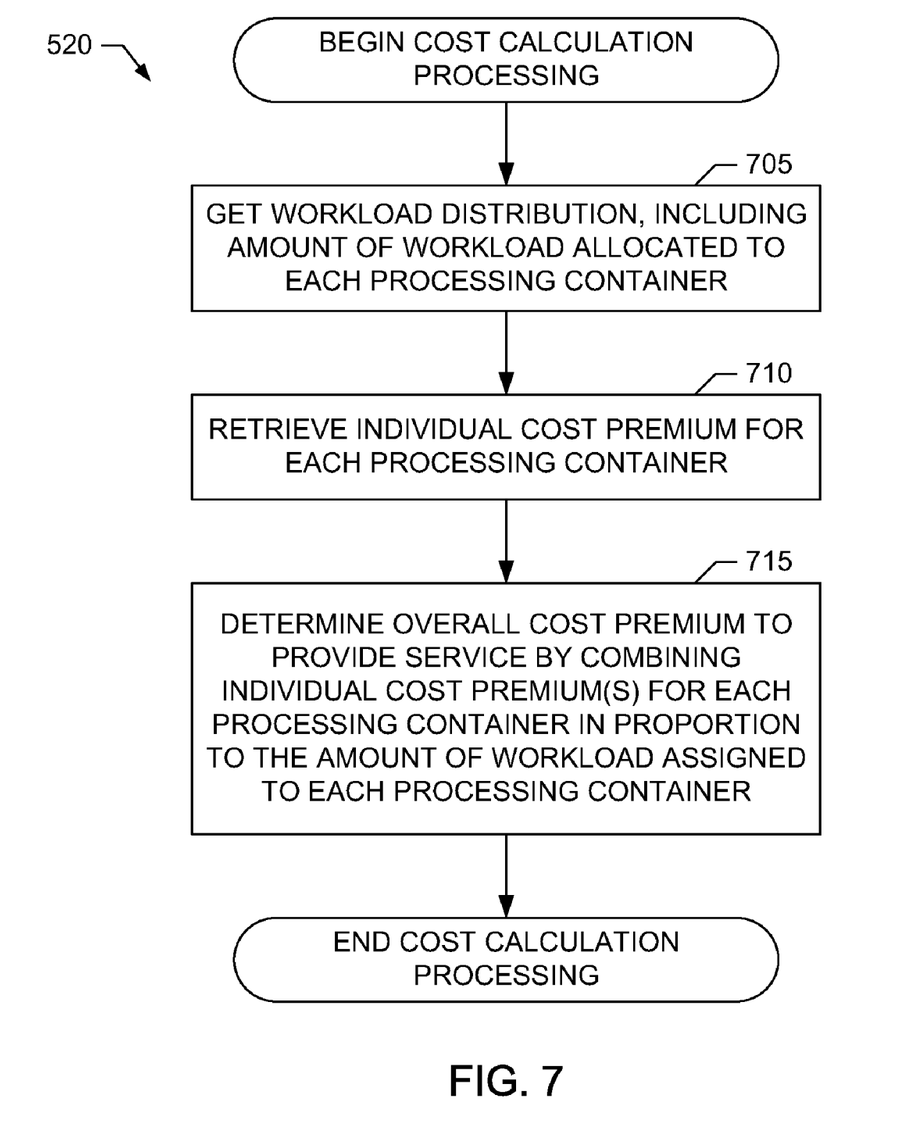
FIG. 7 is a flowchart representative of example machine readable instructions that may be executed to implement an example cost premium calculator illustrated in FIG. 4.

At block 520, the cost calculator 210 included in the environmental evaluator 105 determines overall cost premium(s) associated with the workload distribution(s) determined by the workload distributor 205 at block 515. As further described above, the cost calculator 210 can determine an overall cost premium for a workload distribution by appropriately combining the individual cost premiums of the processing container(s) among which the service's processing workload is to be distributed. Example machine readable instructions that may be used to implement the processing at block 520 are illustrated in FIG. 7, which is described in greater detail below.

At block 525, the cost calculator 210 can adjust the overall cost premium(s) determined at block 520 by a cost offset offered to a customer for agreeing to a change in an SLA requirement (or other quality of service requirement, etc.), as further described above. Then, at block 530 the workload distributor 205 provides (e.g., via the communication interface 215) the resulting overall cost premium(s) for the service workload distribution(s) to a user to enable the user to select a particular workload distribution for providing the service 110. At block 535, the workload distributor 205 receives a workload distribution selection from the user (e.g., via the communication interface 215). Then, at block 540 the workload distributor 205 distributes the service's processing workload among the processing container(s) 115 in accordance with the workload distribution selected at block 535. Execution of the example machine readable instructions 500 then ends.

Figure 6:
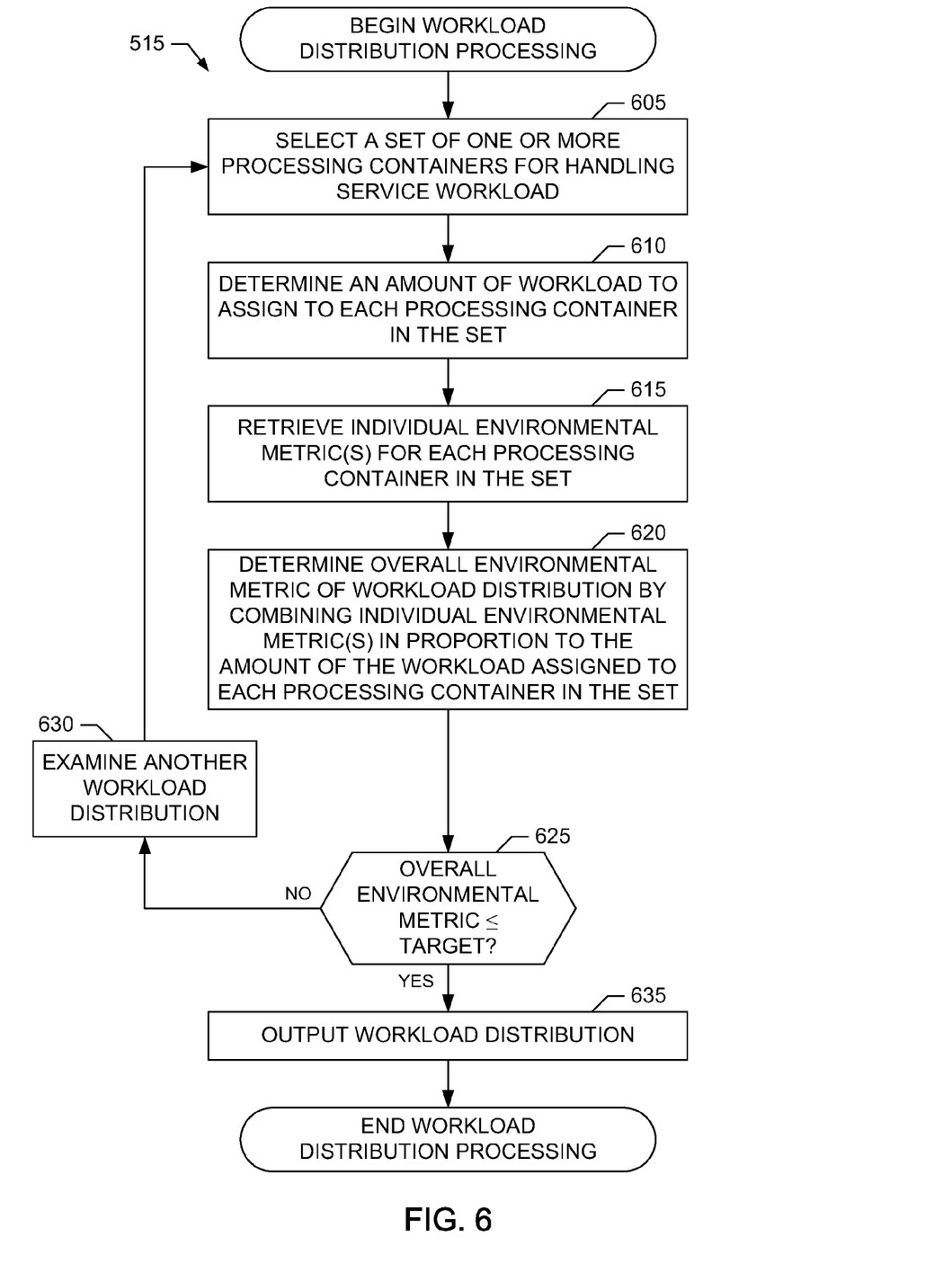
FIG. 6 is a flowchart representative of example machine readable instructions that may be executed to implement the workload distributor of FIG. 3.

Example machine readable instructions 515 that may be executed to implement the example workload distributor 205 of FIGS. 2 and/or 3, and/or the processing at block 515 of FIG. 5 are represented by the flowchart shown in FIG. 6. With reference to the preceding figures, the machine readable instructions 515 begin execution at block 605 of FIG. 6 at which the workload assigner 310 included in the workload distributor 205 selects a set of one or more processing containers 115 among which to distribute the processing workload of a service 110, as further described above. At block 610, the workload assigner 310 determines an amount of the service's processing workload to assign to each of the processing container(s) 115 in the set, as further described above.

At block 615, the environmental calculator 315 included in the workload distributor 205 retrieves (e.g., from the data storage 305) the individual environmental (e.g., carbon content) metric(s) for the processing container(s) 115 included in the workload distribution determined at block 610. Then, at block 620 the environmental calculator 315 determines an overall environmental (e.g., carbon content) metric associated with a workload distribution determined at block 610 using the individual environmental (e.g., carbon content) metric(s) for providing the service that were retrieved at block 615. For example, the environmental calculator 315 can determine the overall carbon content metric for a workload distribution by combining the individual carbon content metric(s) for the processing container(s) 115 to provide the service 110 in proportion to the amount of the processing workload to be assigned to each of these processing containers 115, as further described above.

Next, at block 625 the workload assigner 310 compares the overall environmental (e.g., carbon content) metric determined at block 620 for this workload distribution to an environmental (e.g., carbon content) target specified for this service. If the overall environmental (e.g., carbon content) metric does not achieve the target (block 625), then the workload assigner 310 examines another possible workload distribution for the service's processing workload (block 630). Processing returns to block 605 to enable the workload assigner 310 to determine another possible workload distribution for consideration. However, if the overall environmental (e.g., carbon content) metric does achieve the target (block 625), then the workload assigner 310 outputs the workload distribution (block 635), and execution of the machine readable instructions 515 ends.

Example machine readable instructions 520 that may be executed to implement the example cost calculator 210 of FIGS. 2 and/or 4, and/or the processing at block 520 of FIG. 5 are represented by the flowchart shown in FIG. 7. With reference to the preceding figures, the machine readable instructions 520 begin execution at block 705 of FIG. 7 at which the cost premium calculator 410 included in the cost calculator 210 gets a workload distribution for a service's processing workload from the workload distributor 205. The workload distribution obtained at block 705 includes the amount(s) of processing workload that the workload distributor 205 is to allocate to each of the processing container(s) 115 among which the workload is to be distributed.

At block 710, the cost premium calculator 410 retrieves (e.g., from the data storage 405) the individual cost premium(s) associated with the processing container(s) 115 included in the workload distribution obtained at block 705. As described above, an individual cost premium can represent the cost incurred by a processing container 115 to provide a service at the individual environmental (e.g., carbon content) metric supported by the processing container 115. Then, at block 715 the cost premium calculator 410 determines an overall cost premium associated with a workload distribution obtained at block 705 using the individual cost premium(s) retrieved at block 710. For example, the cost premium calculator 410 can determine the overall cost premium or provide a service using the workload distribution obtained at block 705 by combining the individual cost premium(s) for the processing container(s) 115 included in the workload distribution in proportion to the amount of the processing workload to be assigned to each of these processing containers 115, as further described above. Execution of the machine readable instructions 520 then ends.

Figure 8:
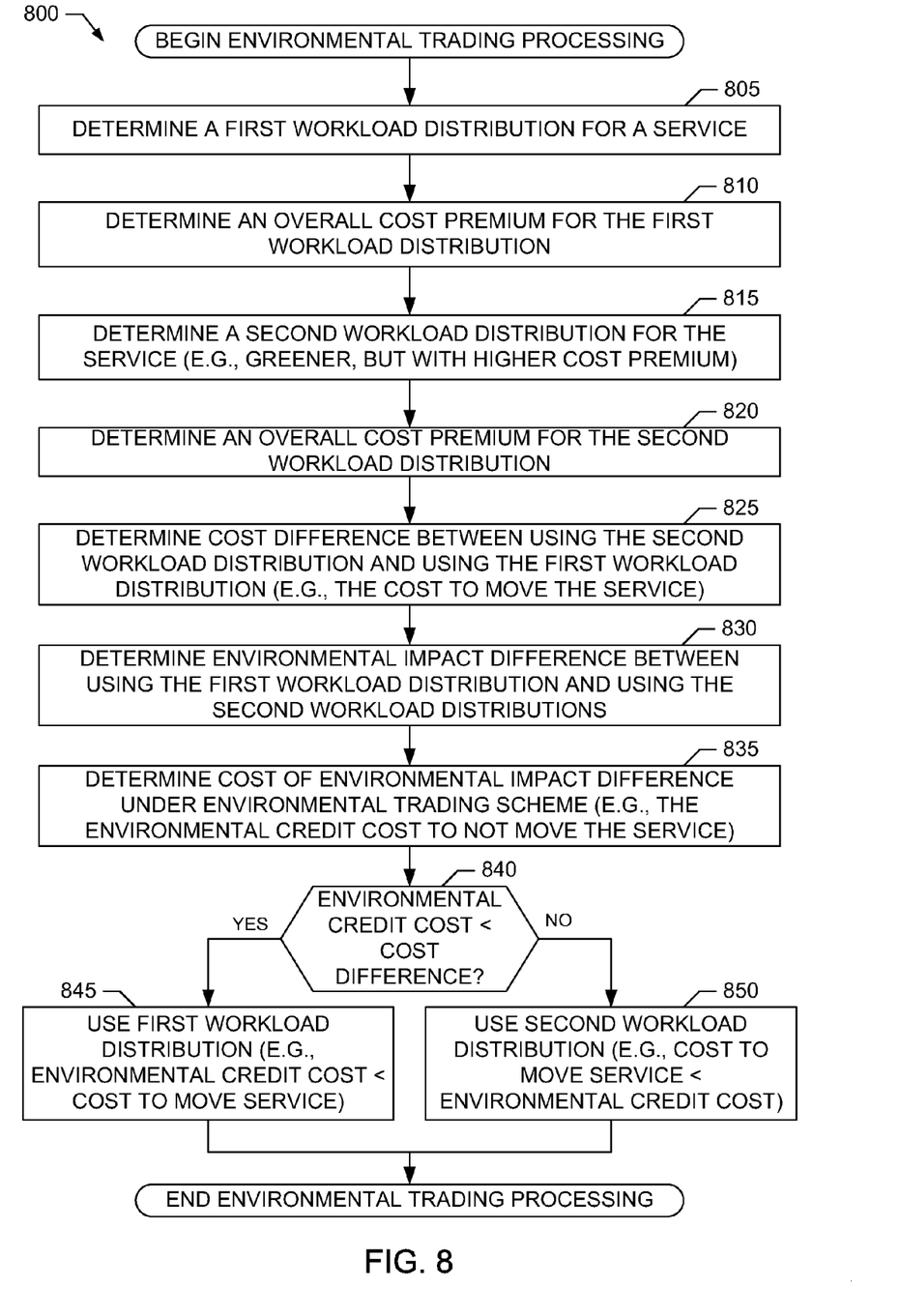
FIG. 8 is a flowchart representative of example machine readable instructions that may be executed to implement an example environmental trading calculator illustrated in FIG. 4.

Example machine readable instructions 800 that may be executed to implement environmental (e.g., carbon) trading processing in the example environmental evaluator 105 are represented by the flowchart shown in FIG. 8. With reference to the preceding figures, the machine readable instructions 800 begin execution at block 805 of FIG. 8 at which the workload distributor 205 determines a first workload distribution for a service 110 (e.g., by using the example machine readable instructions 515 described above). For example, this first workload distribution can correspond to a current workload distribution for an existing service 110 or a possible workload distribution for a new service 110. At block 810, the cost calculator 210 determines an overall cost premium for the first workload distribution determined at block 805 (e.g., by using the example machine readable instructions 520 described above). Similarly, at block 815 the workload distributor 205 determines a second workload distribution for the service 110, and at block 820 the cost calculator 210 determines an overall cost premium for the second workload distribution determined at block 815. For example, this second workload distribution can correspond to a greener solution having a lower overall carbon content metric than the first workload distribution, but with a higher overall cost premium.

At block 825, the environmental trading calculator 415 included in the cost calculator 210 determines a cost difference between the overall cost premium for the second workload distribution and the overall cost premium for the first workload distribution, as further described above. For example, this cost difference can correspond to the additional operating costs (e.g., related to the power source costs) to move the service 110 from the first workload distribution to the second workload distribution. At block 830, the environmental trading calculator 415 determines a environmental impact (e.g., carbon content) difference using the first workload distribution instead of the second workload distribution for providing the service. For example, a carbon content difference can correspond to a difference between the overall carbon content metrics of the first workload distribution and the second workload distribution, and can represent the additional cost in terms of carbon credits needed to provide the service 110 using the first workload distribution instead of the greener second workload distribution. Next, at block 835 the environmental trading calculator 415 determines a environmental (e.g., carbon) credit cost under an emissions trading scheme for the environmental impact (e.g., carbon content) difference determined at block 830. For example, a carbon credit cost can correspond to a cost of additional carbon credits the service provider purchases to provide the service 110 using the first workload distribution.

At block 840, the environmental trading calculator 415 compares the environmental (e.g., carbon) credit cost determined at block 835 for using the first workload distribution and the cost difference determined at block 825 for using the second workload distribution. If the environmental (e.g., carbon) credit cost is less than the cost difference (block 840), then at block 845 the environmental trading calculator 415 can determine that using the first workload distribution provides a cost benefit to the service provider (e.g., because the cost of the additional environmental (e.g., carbon) credits needed to use the first workload distribution is less than the cost to move the service to the second workload distribution). However, if the environmental (e.g., carbon) credit cost is not less than the cost difference (block 840), then at block 850 the environmental trading calculator 415 can determine that using the second workload distribution provides a cost benefit to the service provider (e.g., because the cost to move the service to the second workload distribution is less than or equal to the cost of the additional environmental (e.g., carbon) credits needed to use the first workload distribution). Execution of the machine readable instructions 800 then ends.

Figure 9:
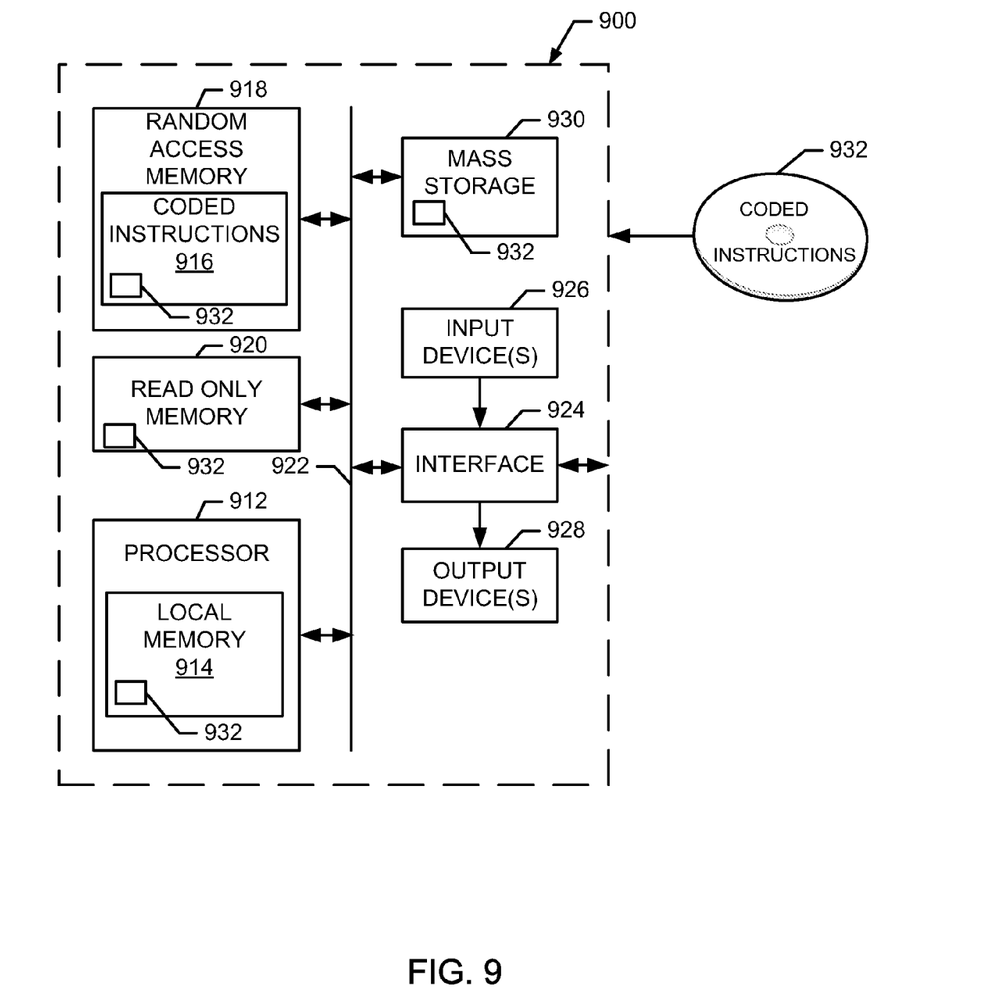
FIG. 9 is a block diagram of an example processing system that may execute the example machine readable instructions illustrated in one or more of FIGS. 5-8 to implement the environmental evaluator of FIGS. 1 and/or 2, the workload distributor of FIG. 3, the cost calculator of FIG. 4 and/or the computing network of FIG. 1.

FIG. 9 is a block diagram of an example processing system 900 capable of implementing the example apparatus, systems and methods disclosed herein. The processing system 900 can be, for example, a server, a personal computer, a personal digital assistant (PDA), an Internet appliance, or any other type of computing device.

The system 900 of the instant example includes a processor 912 such as a general purpose programmable processor. The processor 912 includes a local memory 914, and executes coded instructions 916 present in the local memory 914 and/or in another memory device. The processor 912 may execute, among other things, the machine readable instructions represented in FIGS. 5-8. The processor 912 may be any type of processing unit, such as one or more Intel® microprocessors from the Pentium® family, the Itanium® family and/or the XScale® family, one or more microcontrollers from the ARM® and/or PIC® families of microcontrollers, etc. Of course, other processors from other families are also appropriate.

The processor 912 is in communication with a main memory including a volatile memory 918 and a non-volatile memory 920 via a bus 922. The volatile memory 918 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 920 may be implemented by flash memory and/or any other desired type of memory device. Access to the main memory 918, 920 is typically controlled by a memory controller (not shown).

The processing system 900 also includes an interface circuit 924. In some example, the interface circuit 924 can be used to implement the communication interface 215 describe above. The interface circuit 924 may be implemented by any type of interface standard, such as an Ethernet interface, a universal serial bus (USB), and/or a third generation input/output (3GIO) interface.

One or more input devices 926 are connected to the interface circuit 924. The input device(s) 926 permit a user to enter data and commands into the processor 912. The input device(s) can be implemented by, for example, a keyboard, a mouse, a touchscreen, a track-pad, a trackball, an isopoint and/or a voice recognition system.

One or more output devices 928 are also connected to the interface circuit 924. The output devices 928 can be implemented, for example, by display devices (e.g., a liquid crystal display, a cathode ray tube display (CRT)), by a printer and/or by speakers. The interface circuit 924, thus, typically includes a graphics driver card.

The interface circuit 924 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 900 also includes one or more mass storage devices 930 for storing machine readable instructions and data. Examples of such mass storage devices 930 include floppy disk drives, hard drive disks, compact disk drives and digital versatile disk (DVD) drives. In some examples, the mass storage device 930 may implement the data storages 305 and/or 405 described above. Additionally or alternatively, in some examples the volatile memory 918 may implement the data storages 305 and/or 405.

The coded instructions 932 of FIGS. 5-8 may be stored in the mass storage device 930, in the volatile memory 918, in the non-volatile memory 920, in the local memory 914 and/or on a removable storage medium, such as a CD or DVD 932.

As an alternative to implementing the methods and/or apparatus described herein in a system such as the processing system of FIG. 9, the methods and or apparatus described herein may be embedded in a structure such as a processor and/or an ASIC (application specific integrated circuit).

Example methods, apparatus, systems and articles of manufacture to provide services based on environmental metrics have been disclosed herein. The examples disclosed herein can enable a service provider to deliver services from one or more processing containers such that the service has a particular environmental impact (e.g., carbon content), thereby allowing the service provider to guarantee that a provided service has a specified or offered target (e.g., maximum) environmental impact (e.g., carbon content). Examples disclosed herein also enable a service provider to determine workload distribution(s) to distribute a service's processing workload among multiple processing containers to meet specified or offered environmental (e.g., carbon content) target(s). Examples disclosed herein further enable the service provider to price services differently based on their respective environmental (e.g., carbon content) metrics, and to provide flexibility in pricing by offering different workload distributions having difference respective overall environmental (e.g., carbon content) metrics for a service.

Additionally, examples disclosed herein enable a service provider to assess cost benefits of different service workload distributions under an emissions trading scheme. For example, a service provider can employ an example disclosed herein to determine workload distributions among processing container(s) that can increase revenue by freeing up environmental (e.g., carbon) credits that can be sold or traded on the open market. Additionally, examples disclosed herein can be used by service providers to determine environmental (e.g., carbon) trading costs that can passed along to service users. For example, a service provider can employ an example disclosed herein to determine a cost of purchasing additional carbon credits when a service's workload is increased and is to be provided by processing container(s) having higher carbon content metrics.

Finally, although certain example methods, apparatus, systems and articles of manufacture have been described herein, the scope of coverage of this patent is not limited thereto. On the contrary, this patent covers all methods, apparatus, systems and articles of manufacture fairly falling within the scope of the claims either literally or under the doctrine of equivalents.

What is claimed is:

1. A method to provide a service based on an environmental metric, the method comprising:
assigning, with a processor, a first workload distribution to distribute a processing workload for the service among first and second processing containers to meet an environmental target, the first and second processing containers to provide the service at respective first and second individual environmental metrics;
combining, with the processor and based on the first workload distribution, first and second individual costs that would be incurred respectively by the first and second processing containers to provide the service entirely at the respective first and second individual environmental metrics to determine an overall cost to provide the service using the first workload distribution, the combining comprising combining the first and second individual costs in proportion to a first amount of the processing workload to be assigned to the first container according to the first workload distribution and a second amount of the processing workload to be assigned to the second processing container according to the first workload distribution;
determining a plurality of workload distributions to distribute the processing workload for the service, the plurality of workload distributions meeting respective different environmental targets, the plurality of workload distributions including the first workload distribution;
determining overall costs associated with respective ones of the plurality of workload distributions, the overall costs including the overall cost to provide the service using the first workload distribution; and selecting one of the plurality of workload distributions to provide the service based on the environmental targets and the overall costs.

2. A method as defined in claim 1 wherein assigning the workload distribution comprises:

determining the first amount of the processing workload to assign to the first processing container; and determining the second amount of the processing workload to assign to the second processing container, the environmental target being a carbon content target.

3. A method as defined in claim 2 further comprising:

combining individual carbon content metrics associated respectively with the first and second processing containers in proportion to the first amount of the processing workload to be assigned to the first container and the second amount of the processing workload to be assigned to the second processing container to determine an overall carbon content metric for the first workload distribution; and determining whether the overall carbon content metric is less than or equal to the carbon content target.

4. A method as defined in claim 1 wherein the first and second individual costs are based on power sources used to power the first and second processing containers, and the first and second individual costs are normalized to a reference utility grid power source.

5. A method as defined in claim 1 further comprising adjusting the overall cost based on a cost offset offered for agreeing to a change in a service level requirement.

6. A method as defined in claim 1 wherein the overall cost is a first overall cost, the method further comprising:

determining a second overall cost associated with a second workload distribution to distribute the processing workload for the service, the second workload distribution being different from the first workload distribution;

determine a cost difference between the second overall cost and the first overall cost;

determining a carbon credit cost for a carbon content difference between a first overall carbon content metric for the first workload distribution and a second overall carbon content metric for the second workload distribution;

selecting the first workload distribution to provide the service when the carbon credit cost is less than the cost difference; and selecting the second workload distribution to provide the service when the cost difference is less than the carbon credit cost.

7. A method as defined in claim 1 wherein combining the individual costs in proportion to the first amount of the processing workload to be assigned to the first container and the second amount of the processing workload to be assigned to the second processing container comprises:

weighting the first individual cost in proportion to the first amount of the processing workload to be assigned to the first container according to the first workload distribution; and weighting the second individual cost in proportion to the second amount of the processing workload to be assigned to the second processing container according to the first workload distribution.

8. An apparatus to provide a service workload distribution based on an environmental metric, the apparatus comprising:

a workload distributor to determine workload distributions to distribute a processing workload for a service among sets of processing containers, the workload distributor to determine respective overall environmental metrics for the workload distributions based on individual environmental metrics respectively associated with the processing containers in the sets of processing containers, the workload distributions meeting respective different environmental targets;

a cost calculator to determine respective overall costs for the workload distributions based on combining individual costs respectively associated with the processing containers in the sets of processing containers associated with the workload distributions, the cost calculator to determine a first overall cost to provide the service using a first one of the workload distributions by combining at least first and second individual costs, which would be incurred respectively by first and second processing containers to provide the service, in proportion to a first amount of the processing workload to be assigned to the first container according to the first one of the workload distributions and a second amount of the processing workload to be assigned to the second processing container according to the first one of the workload distributions; and an interface to present the workload distributions and the overall costs, and to receive a selection of one of the workload distributions to provide the service.

9. An apparatus as defined in claim 8 wherein, to determine the first one of the workload distributions, the workload distributor is to:

select a set of processing containers among which to distribute the processing workload, the set to include the first processing container and the second processing container;

determine the first amount of the processing workload to assign to a first processing container;

determine the second amount of the processing workload to assign to a second processing container; and combine first and second individual environmental metrics associated respectively with the first and second processing containers in proportion to the first amount of the processing workload to be assigned to the first container and the second amount of the processing workload to be assigned to the second processing container to determine an overall environmental metric for the first one of the workload distribution distributions.

10. An apparatus as defined in claim 8 wherein the workload distributions include first and second workload distributions, the environmental metric is a carbon content metric, and the cost calculator is to:

determine a cost difference between a second overall cost for the second workload distribution and a first overall cost for the first workload distribution; and determine a carbon credit cost for a carbon content difference between a first overall carbon content metric for the first workload distribution and a second overall carbon content metric for the second workload distribution; and the workload distributor is to select one of the first workload distribution or the second workload distribution to provide the service based on the cost difference and the carbon credit cost.

11. An apparatus as defined in claim 8 wherein the cost calculator is to combine the first and second individual costs in proportion to the first amount of the processing workload to be assigned to the first container and the second amount of the processing workload to be assigned to the second processing container by:

weighting the first individual cost in proportion to the first amount of the processing workload to be assigned to the first container according to the first one of the workload distributions; and weighting the second individual cost in proportion to the second amount of the processing workload to be assigned to the second processing container according to the first one of the workload distributions.

12. A system to provide a service based on an environmental metric, the system comprising:

processing containers to provide the service, the processing containers having respective environmental metrics associated with providing the service, the processing containers having respective individual cost premiums for providing the service entirely at the respective environmental metrics;

a workload distributor to:
  determine first and second workload distributions to distribute a processing workload for the service among the processing containers; and
  determine first and second overall environmental metrics for the first and second workload distributions based on the environmental metrics associated with the respective processing containers assigned to the first and second workload distributions, the first and second workload distributions meeting respective different environmental targets; and a cost calculator to:
  determine a cost difference between a second overall cost premium for the second workload distribution and a first overall cost premium for the first workload distribution, the first and second overall cost premiums determined by combining the respective cost premiums associated with the respective processing containers assigned to the first and second workload distributions, the first overall cost premium to be determined by combining at least first and second individual cost premiums associated with respective first and second processing containers in proportion to a first amount of the processing workload to be assigned to the first container according to the first workload distribution and a second amount of the processing workload to be assigned to the second processing container according to the first workload distribution; and
  determine an environmental credit cost for a difference between the first and second overall environmental metrics, the workload distributor to select one of the first workload distribution or the second workload distribution to provide the service based on the cost difference and the environmental credit cost.

13. A system as defined in claim 12 wherein, to determine the first workload distribution, the workload distributor is to:
  determine the first amount of the processing workload to assign to a first processing container;
  determine the second amount of the processing workload to assign to a second processing container;
  combine first and second environmental metrics associated respectively with the first and second processing containers in proportion to the first amount of the processing workload to be assigned to the first container and the second amount of the processing workload to be assigned to the second processing container to determine the first overall environmental metric.

14. A system as defined in claim 12 wherein the cost calculator is to combine the first and second individual cost premiums in proportion to the first amount of the processing workload to be assigned to the first container and the second amount of the processing workload to be assigned to the second processing container by:
  weighting the first individual cost in proportion to the first amount of the processing workload to be assigned to the first container according to the first workload distribution; and
  weighting the second individual cost in proportion to the second amount of the processing workload to be assigned to the second processing container according to the first workload distribution.

* * * * *

UNITED STATES PATENT AND TRADEMARK OFFICE
CERTIFICATE OF CORRECTION

| | | |
|---|---|---|
| PATENT NO. | : 8,392,574 B1 | Page 1 of 1 |
| APPLICATION NO. | : 12/915866 | |
| DATED | : March 5, 2013 | |
| INVENTOR(S) | : Amip J. Shah et al. | |

It is certified that error appears in the above-identified patent and that said Letters Patent is hereby corrected as shown below:

In the Claims

In column 20, line 46, in Claim 9, after "workload" delete "distribution".

Signed and Sealed this
Seventeenth Day of September, 2013

Teresa Stanek Rea
*Deputy Director of the United States Patent and Trademark Office*